United States Patent [19]

Zengel et al.

[11] 4,437,960

[45] Mar. 20, 1984

[54] METHOD FOR THE CROSSLINKING OF CATHODICALLY DEPOSITABLE COATING AGENTS

[75] Inventors: Hans-Georg Zengel, Kleinwallstadt; Hilde Kersten, Erlenbach; Helmut Mägerlein, Obernburg, all of Fed. Rep. of Germany

[73] Assignee: Akzo, nv, Arnham, Netherlands

[21] Appl. No.: 329,562

[22] Filed: Dec. 10, 1981

[30] Foreign Application Priority Data

Dec. 17, 1980 [DE] Fed. Rep. of Germany ....... 3047525

[51] Int. Cl.$^3$ ...................... C25D 13/06; C25D 13/10
[52] U.S. Cl. ................................................ 204/181 C
[58] Field of Search ................................... 204/181 C

[56] References Cited

U.S. PATENT DOCUMENTS 4,120,768 10/1978 Gibson et al. ................... 204/181 C
4,204,932 5/1980 McGinniss et al. ............. 204/181 C Primary Examiner—Howard S. Williams
Attorney, Agent, or Firm—Michael J. Striker

[57] ABSTRACT

Method for the crosslinking of cathodically depositable coating agents, optionally containing pigment, dyestuff, filler, solvent, varnish adjuvant or additional crosslinking components, based upon a water-soluble or -dispersible nitrogen based cationic resin, at least partially present as salt, in which a cationic resin of molecular weight greater than 1000, containing 2 to 20 equivalents of double bonds per 1000 g, is contacted with sulfur and/or one or more sulfur-containing vulcanization acceleration. The coating mixture is then electrophoretically deposited upon an object, and hardened at temperatures above 120° C. The resin may contain tertiary atoms of carbon, and also one or more sulfur-free vulcanization accelerators may be used. The resin is a reaction product of at least (A) one epoxidized polydiene and/or (B) one bisglicydylether of a polyphenol and (C) one amide compound formed from one or more higher, essentially unsaturated fatty acids and a polyamine, and can contain a ketimino or hydroxyl group, and/or (D) one hydrazide compound, which contains tertiary amino groups, and if necessary (E) one organic secondary amine, and has been made with an acid under formation of cationic groups dispersible in water. The invention also encompasses hardened coatings obtained according to this method.

16 Claims, No Drawings

METHOD FOR THE CROSSLINKING OF CATHODICALLY DEPOSITABLE COATING AGENTS

BACKGROUND OF THE INVENTION

The present invention concerns a method for the crosslinking of cathodically depositable, if necessary pigment, dyestuff, filler, solvent, varnish adjuvant and additional crosslinking components-containing coating agents, based upon a water-soluble or -dispersible, at least partially present as salt, nitrogen based cationic resin. It concerns likewise the hardened coating, which is obtained by the crosslinking process according to the present invention.

The known and practiced polyisocyanate-crosslinking of cathodically depositable coating agents is so far still not optimal, as the temperature necessary herewith is relatively high and amounts to about 180° C. Through the cleavage of alcohol used for blocking of the diisocyanate, there arises in particular considerable baking loss, which brings about relatively great emissions. Also less than optimal is the maximum obtainable adhesive strength of the coating on steel, a characteristic which is still desired, completely irrespective of any requirements for the use of adhesives based upon heavy metal compounds, in particular lead compounds.

SUMMARY OF THE INVENTION

The present invention is therefore based upon the object of providing a new method for the crosslinking of cathodically depositable coating agents, with which considerable less emissions occur, and which can be carried out at lower temperatures, nevertheless without use of toxic heavy metal compounds as adhesives, yielding coatings of improved quality.

This object is attained according to the present invention by bridging into contact a cationic resin with a molecular weight of at least 1,000 and a content of 2 to 20 equivalents of double bond/1,000 g, if necessary containing tertiary C atoms, with sulfur and/or one or more sulfur-containing vulcanization accelerators, if necessary in combination with one or more sulfur-free vulcanization accelerators, and after electrophoretic deposition, hardening at a temperature of above 120° C.

The successful sulfur crosslinking of cathodically depositable coating agents is surprising, since anaphoresis varnishes are unsuitable for a sulfur crosslinking.

According to U.S. Pat. No. 4,133,916 it is indeed known to use a carbamothioate as hardening reagent (curing agent) for the crosslinking of electrophoresis lacquers. These hardening agents produce, however, under hardening conditions with heating, through deblocking, reactive isocyanate groups and also mercaptan groups adapted for crosslinking, effecting thus no sulfur crosslinking in the sense of the present invention. From the examples in the patent, one learns beyond that, that for the hardening of electrophoresis lacquers the detrimental and very high temperature of 205° C. is considered to be necessary.

In German Offenlegungsschrift DE-OS No. 2 057 799 it is suggested to use heat hardenable polysulfide resin for the production of electrophoresis resins, and to harden the electrophoresis resin only with the aid of a blocked multifunctional isocyanate. A sulfur crosslinking in the sense of the present invention does not occur. The same is established relative to U.S. Pat. No. 3,468,779, wherein it is suggested as an optional measure to admix into its electrophoretically depositable epoxy resin esters, which as such are indeed hardenable, in addition to a series of other modification agents, also polysulfide resin.

The sulfur crosslinking according to the present invention can be effected with pure sulfur, e.g. sulfur of average fineness (70–80 Chancel grade), which allows for good distribution. The use of sulfur or sulfur pastes treated with dispersants is also advantageous. The sulfur can also be employed mixed with $MgCO_3$ or CaO, as more fluid Crystex- or Spider-Brand designated sulfur; in like manner as colloidal sulfur. The addition of the sulfur can follow solely by admixing it to the resin suspension with stirring. It is also easy to achieve its working-up in the pigment paste or in dissolved form, e.g. in $CS_2$ or $(NH_4)_2S$, to stir into the aqueous dispersion to be electrophoretically deposited, whereby naturally the solvent must be subsequently removed by vacuum.

The use of one or more sulfur-containing vulcanization accelerators is also possible for the sulfur crosslinking according to the present invention. These include also the so-called sulfur donors.

The following compound types are thus suitable for this purpose: dimorpholyl disulfide (DTDM), 2-morpholinodithiobenzothiazol (MBSS), caprolactam disulfide, dipentamethylenethiuramtetrasulfide, tetramethylthiuramdisulfide, thiazole accelerators, such as 2-mercaptobenzothiazole (MBT), dibenzothiazyldisulfide (MBTS), the zinc salt of 2-mercaptobenzothiazole (ZMBT); sulfenamides, which are produced through the reaction of 2-mercaptobenzothiazole with primary and second amines under oxidative conditions, e.g. benzothiazyl-2-cyclohexylsulfenamide (CBS), benzothiazyl-2-tert.-butylsulfenamide (TBBS), benzothiazyl-2-sulfenmorpholide (MBS), benzothiazyl-dicyclohexylsulfenamide (DCBS); thiurams, such as tetramethylthiuramdisulfide (TMTD), tetramethylthiuram-monosulfide (TMTM); dithiocarbamates, such as zinc-N-dimethyldithiocarbamate (ZDMC), zinc-N-diethyldithiocarbamate (ZDEC), zinc-N-dibutyldithiocarbamate (ZDBC), zinc-N-ethylphenyldithiocarbamate (ZEPC) and zinc-N-pentamethylenedithiocarbamate (Z5MC); ureas, such as ethylenethiourea (ETU), diethylthiourea (DETU), diphenylthiourea (DPTU), xanthogenate accelerators, such as sodium, zinc isopropyl or zinc dibutylxanthogenate, and other sulfur-type vulcanization accelerators, such as zinc dibutyldithiophosphate (ZBPD), the copper salt of 2-mercaptobenzothiazole, telluriumdiethyldithiocarbamate and polysulfides, such as di-t-nonylpolysulfide.

The sulfur or the sulfur-containing vulcanization accelerator(s) can be used alone or in combination for the achievement of the sulfur crosslinking. Herewith moreover a combination with one or more sulfur-free vulcanization accelerators can be advantageous. Suitable ones include, e.g. triazines; guanidines, such as diphenylguanidine (DPG), di-ortho-tolylguanidine (DDTG), ortho-tolylbiguanide (OTBG); amines, such as cyclohexylethylamine and di- or triethanol amine; aldehydeamine condensation products, such as hexamethylenetetramine (HEXA) and the condensation products of butyraldehyde with aromatic amines, such as aniline; polymethylolphenol resins; nitrosophenoles nitrosoamines.

The portion of sulfur, relative to the cationic resin, can vary within wide limits, and amounts generally to 1 to 40% by weight. The insertion of 2 to 10% by weight, relative to the cationic resin, is preferred. If the crosslinking is performed exclusively with sulfur-containing vulcanization accelerators, the portion inserted, relative to the cationic binding agent, amounts to about 0.5 to 20% by weight, preferably 2 to 10% by weight. Also the amount of if necessary also used sulfur-free vulcanization accelerators can vary considerably, amounting as a rule to between 0.5 and 20% by weight, relative to the cationic resin. Preferably, the amount by weight is between 2 and 10%, relative to the cationic resin. In case of the use of sulfur and sulfur-containing and/or sulfur-free vulcanization accelerators, the total portion amounts to between 1 and 40% by weight, preferably 2 to 10% by weight, whereby the weight ratio of sulfur to sulfur-containing and/or sulfur-free vulcanization accelerators can vary between the limits 10:0.1 and 0.1:10.

It has moreover been shown that the use of sulfur-containing and/or sulfur-free vulcanization accelerators improves the throwing power of the electrophoresis resin, whereas elementary sulfur in general does not influence the throwing power. With a combined use of sulfur and sulfur-containing and/or sulfur-free vulcanization accelerators as a rule with the customary total amount supplied for crosslinking of about 1 to 40% by weight and the above given weight ratio, of the components in question, the referred to effect is likewise produced. In other respects, it presents difficulty of no sort for an average expert, to determine the optimal input amount according to choice of the used sulfur-crosslinking agents through simple routein testing. This applies also for the case of the additional use of sulfur-free vulcanization agents.

The resins suitable for sulfur crosslinking display a molecular weight of at least 1,000 and a content of about 2 to 20 equivalents of double bonds per 1,000 g. They can if necessary contain tertiary C-atoms. Preferably, the resin used possesses 6 to 15 equivalents of double bonds per 1,000 g and contains no ester groupings. In principle, indeed resins with ester groups and the required content of 2 to 20 equivalents of double bonds per 1,000 g, which if necessary also contain tertiary C-atoms, likewise are accessible to a sulfur crosslinking. The thereby resulting lacquers, however, as a result of hydrolysis, do not display the bath stability required for the electrophoretic coating of car bodies, likewise not the therewith connected constant deposition conditions and constant quality of the deposited film. Cationic resin with ester groupings and a content of 2 to 20 equivalents of double bounds per 1,000 g allow for other purposes and types of application, with which a smaller hydrolysis stability is required, by all means according to the hardness in consequence of the sulfur crosslinking method of the invention, and their use forms therefore likewise the subject of the present invention.

It has moreover been shown that excellent results in particular are then obtained, when the resin used is a reaction product of at least
(A) an epoxidized polydiene and/or
(B) a bisglycidylether of a polyphenol and
(C) an amide compound, which is formed from one or more higher, substantially unsaturated fatty acid(s) and a polyamine and can contain a ketimino group or hydroxyl group, and/or
(D) a hydrazide compound, which contains tertiary amino groups, and if necessary (E) is an organic secondary amine and has been made with an acid with formation of cationic groups dispersible in water.

As epoxidized polydiene, the following defined materials are used with the present invention, which preferably contains so many epoxide groups in the molecule, that the cationic resin synthesized with them displays excess epoxide groups. Cationic resins, which contain no excess epoxide groups, form however likewise the subject of the invention. The epoxidized polydiene comprises a molecular weight of at least 400, as a rule from 500 to 6,000. Chemically they are derived from a homopolymer or copolymer of one or more alkadienes. The copolymers can contain also cycloalkadienes, such as cyclopentadiene or dicyclopentadiene. As examples of suitable alkadienes, mention may be made of 1,3-butadiene, isoprene, chloroprene, 1,3-pentadiene, 1,4-pentadiene and 1,4-hexadiene. The adequately known alkadiene homo- or copolymers are epoxidized in known manner. Herewith it is preferred that the resulting reaction product exhibits an epoxide group content per 1000 g of at least 2 equivalents, in particular from 2 to 7 equivalents. Epoxypolybutadiene-1,2- and epoxypolybutadiene-1,4-polymers have proven to be particularly favorable with the synthesis of water-dispersible cationic resins, likewise epoxy compounds of a polybutadiene with 1,2- and 1,4-linkages.

The bisglycidylethers of a polyphenol used with the present invention are known per se and are produced e.g. through alkoxylation (etherification) of a polyphenol with epichlorohydrin or dichlorohydrin in the presence of alkali. Suitable polyphenols are e.g. bisphenol A (=2,2-bis(4-hydroxyphenyl)-propane), bis(4-hydroxyphenyl)butane, 4,4-dihydroxybenzophenone, bis(4-hydroxyphenyl)-1,1-ethane, bis(4-hydroxyphenyl)-1,1-isobutane, bis(4-hydroxy-tert.butylphenyl)-2,2-propane, bis(2-hydroxynaphthyl)-methane and 1,5-hydroxynaphthalene. The used bisglycidylether of a polyphenol can be monomeric or polymeric compounds or a mixture thereof and the average number of epoxide groups per molecule is normally greater than 1. For the synthesis of the water-dispersible cationic resins used for sulfur crosslinking, bisglycidylethers based upon bisphenol A, which display 1 to 6 equivalents of epoxide groups per 1,000 g, are favored.

The amide compounds used according to the present invention ae derived, with reference to the acid component, from higher, substantially unsaturated fatty acids with one or more double bonds; examples for the polyunsaturated fatty acids, found as fatty acid derivatives in natural oils, such as linseed oil, tall oil and castor oil, are 9,11-octadecadienic acid, 9,12-octadecadienic acid, linoleic acid, linolenic acid, α-eleostearic acid and β-eleostearic acid. Examples for mono-unsaturated fatty acids are e.g. oleic acid, its higher homologs and zoomaric acid. Obviously, appropriate and similar synthetic fatty acids can also serve as starting material. The fatty acids can be used as amide component individually or as a mixture. On economical grounds, it is however preferred to use the commercially available mixtures of such acids, which also contain in small amounts still saturated fatty acids.

Thus, for example, acids of dehydrated castor oil (ricinenic acid) are suitable as acid component for the amide compounds usable for the sulfur crosslinking. This represents a mixture of dehydrated castor oil-fatty acids and is composed substantially of 9,11-octadecadienic acid and 9,12-octadecadienic acid (ricinenic acids)

with 5–7% oleic acid and 3–5% saturated fatty acids. Likewise suitable are also the linseed oil fatty acids, which represent mixtures of linolenic acid (~38%), linoleic acid (~42%), oleic acid (~10%), stearic acid (~3%) and palmitic acid (~7%), the percent composition of which naturally can fluctuate within limits.

Likewise suitable for sulfur crosslinking are also the unsaturated fatty acids, which are synthesized on the basis of heat polymerization of poly-unsaturated fats and fatty acids. With the heat polymerization of monoesters of unsaturated fatty acids the formation of dimers is prevalent, e.g. of esters of a dimeric linoleic acid. Likewise usable are unsaturated fatty acids, which are produced on the basis of alkali-isomerisation or catalytic isomerisation. With these processes, unsaturated fats and fatty acids with non-conjugated double bonds are converted to products with conjugated double bonds. It is thus for example possible, after the alkali-isomerisation, to produce 30–50% conjugate acids in linseed oil.

Concerning the amine component the amide compounds usable for sulfur crosslinking are derived preferably from amines with at least one primary amino group and a secondary amino group. These amines can also contain an OH-group. As examples of such compounds, mention may be made of: diethylenetriamine, methylaminopropylamine, N-(2-aminoethyl)-1,3-diaminopropane, N-methyl-1,3-diaminopropane, 3-amino-1-cyclohexylaminopropane, N-oleyl-1,3-diaminopropane, N-dodecyl-1,3-diaminopropane, N-cetyl-1,3-diaminopropane, 1-(2-aminoethyl)-piperazine, N-(2-hydroxyethyl)-1,2-diaminoethane.

In other respects, the amide compounds, which are formed at least from one or more higher, substantially mono- and/or poly-unsaturated fatty acids and a polyamine, can contain not only a hydroxyl group, but also a ketimino group. Thus, e.g. a primary amino group of the polyamine used for synthesis of the amide compounds is converted through reaction with ketones into a Schiff base. The partial blocking of a primary amino group, e.g. in the fatty acid amides produced from diethylenetriamine and ricinenic acids or linseed oil, by means of ketones, such as methylisobutylketone, diethylketone, dipropylketone, dibutylketone and cyclohexanone, improves, after splitting off of the blocking agent in water, the solubility of the product, and the films are harder after the stoving. Within the scope of the invention it is preferred that the components (C) represent the reaction product of ricinenic fatty acids and/or linseed oil fatty acids with diethylenetriamine, and it can contain a ketimino group.

The hydrazide compounds (D) useful for formation of the cationic resin, which contain tertiary amino groups, can be derived from, e.g. acrylates and methacrylates. The introduction of tertiary amino groups into the mentioned acid ester follows e.g. through addition of secondary amines, such as dimethylamine, diethylamine, dipropylamine, di-n-decylamine and diphenylamine. The production of tertiary amino groups can also be achieved through addition of all of the above mentioned amide compounds (C) upon acrylates or methacrylates. These amide compounds possess likewise the secondary amino groups necessary for the addition reaction and beyond that the advantage of having available double bonds of the mono- and/or poly unsaturated fatty acids, which can be sulfur crosslinked. The N-disubstituted $\beta$-aminopropionic acid- or isobutyric acid-esters actually resulting from the addition reaction allows through simple reaction with hydrazine, easy conversion into the corresponding N-disubstituted carboxylic acid hydrazide. Beyond that, also other hydrazide compounds with tertiary amino groupings may be used. Thus are formed suitable N,N-disubstituted α-amino acid hydrazides through hydrazinolysis of the corresponding N,N-disubstituted α-amino acid esters. Within the scope of the invention it is preferred that the component (D) represent a carboxylic acid hydrazide with a tertiary amino group, formed through reaction of acrylates or methacrylates or α-halogen carboxylic acid esters with dialkylamines of chain length $C_1$–$C_{18}$ or dialkenylamines of chain length $C_2$–$C_{18}$ or amide compounds, which represent the reaction product of ricinenic fatty acids and/or linseed oil fatty acids with diethylenetriamine and can contain a ketimino group, and subsequent hydrazinolysis.

If necessary, organic secondary amines, which if necessary can contain an OH-group, can be used at the same time for formation of the sulfur crosslinkable cationic resin. As examples of suitable compounds, the following may be mentioned: diethanolamine, methylethanolamine, diethylamine, dimethylamine, dipropylamine, bis-(2-hydroxypropyl)-amine, bis-(3-hydroxypropyl)-amine, bis-(2-hydroxybutyl)-amine, bis-(4-hydroxybutyl)-amine and bis-(2-hydroxy-2-methylpropyl)-amine. Naturally, not only the individual compounds as such, but also mixtures of two or more of the above-mentioned amines can be used. It is preferred, to use diethylamine and/or methylethanolamine and/or diethanolamine as organic secondary amines.

For modification of the sulfur crosslinkable cationic resins under discussion, particularly on cost grounds, it can often be advantageous, to add if necessary additional still other double bond containing reaction components. As such, in particular the reaction products of allyl alcohol, methallylalcohol, 5- or 6-hydroxymethylene-bis-cyclo(2,2,1)-hept-2-en, hydroxyalkylmethacrylate and N-methylolmethacrylate in mole ratio of 1–1.5:1 with diisocyanates, such as mixtures of 2,4-diisocyanatotoluene and 2,6-diisocyanatotoluene, 4,4'-diisocyanato-diphenylmethane, 1,4-diisocyanatobenzene, hexamethylenediisocyanate and isophorondiisocyanate, are suitable. The produced, double bond-containing urethane derivatives display still a reactionable isocyanate group and can be coupled to the above described resin at a temperature from 20° to 70° C. A similar modification is achieved with products, which are obtained through reaction of the above described, double bond- and a secondary amino group-containing amide compound (C) with diisocyanates in the mentioned mole ratio. The corresponding, double bond-displaying urea derivative contains likewise yet a free isocyanate group, allowing thus coupling in similar manner to the resin used for sulfur crosslinking. The so produced advantageous urethane- or urea-modification of the above described resin should as a rule not exceed 50% by weight of the resin to be modified.

The synthesis of the resin in question can in general be effected by providing component (A) and/or (B), and adding components (C) and/or (D), and if necessary (E), at a temperature of about 100° to 200° C. under stirring and inert gas atmosphere. The thereby resulting reactionable component mixture is allowed to react at the chosen temperature for about 5 to 30 minutes and is then cooled down, in connection with which in this stage, in case a modification is desired, the above described, double bond-containing urethane- and/or urea-derivative can be mixed in at a temperature from about 60° to 80° C., and allowed to afterreact for about up to ½ hour. Depending upon the chosen combination of the potential components (A) to (E), in other respects on the basis of simple test work, the from time to time most favorable reaction conditions and addition sequence can be easily determined.

It has for example proven to be expedient, with use of components (A) and (B) and (C), to stir the component (C) into the components (A) and (B) at a temperature from about 130° C., and allow the resulting reaction mixture to react about 30 minutes. Likewise one can proceed by adding the component (C) and (E) to the components (A) and (B).

Expediently, with the combination (A) and (C) or (E), one allows the reaction mixture to react at 160° C. for from 0.5 to 2 hours (Example 1 and 2 in Table 1).

With the combination of (A), (B) and (D), it is appropriate for the avoidance of undesired crosslinking, to heat component (A) and component $D_1 = \beta$-(diethylamino)-propionic acid hydrazide to a temperature of about 200° C. allowing a reaction period of 15 minutes. Then the reaction mixture is cooled down to about 100° C., component (B) and if necessary $D_2 = \beta$-di(-ricineneamidoethyleneamino)-propionic acid hydrazide are stirred in and allowed to after-react for about 15 minutes.

With the two-component system (B) and (C) or (D) it is sufficient to add the component (C) or (D) dropwise to component (B) at about 100° C. under stirring, and to allow a reaction period of about 15 minutes for the resulting reaction mixture.

The amino group of the resin produced on the basis of the different variation possibilities for initial components (A) to (E) are, with an acid, at least partially, e.g. to 10, 30, 50, 70 or 80%, converted to amine salt groups, and the resin thereby made water-dispersible. This is accomplished in known manner by means of an inorganic, organic, complex-forming or non-complex-forming acid. Examples of suitable acids, which also can be used as mixtures, are carboxylic acids, such as formic acid, acetic acid and propionic acid, phosphoric acid, sulfuric acid, glycolic acid, lactic acid and tartaric acid. The acid is added diluted with water for a better working-in. In general, one uses so much water, that a suspension with 50-80% content of solids is obtained.

Besides water, the aqueous medium can contain still other solvents, for the sake of better solubility. Such solvents are e.g. alcohols, such as i-propanol, n-propanol, glycols and diglycols, esters, such as the monomethyl-, monoethyl-, monobutyl- and monohexylether of ethyleneglycolacetate, ketones, such as diethylketone and methylisobutylketone, or mono- and diethers of glycols or diglycols, such as glycol-monomethylether, glycol-monoethylether, glycol-monobutylether, diglycol-diethylether and diglycol-di-n-butylether. The amount lies in general between 5 and 25% by weight, relative to the total weight of the aqueous medium.

The product with a solid content of 50-80% by weight can then by means of customary mixing techniques under further dilution with water be mixed homogeneously as 5-25% by weight dispersion with sulfur and/or one or more sulfur-containing vulcanization accelerators, if necessary in combination with one or more sulfur-free vulcanization accelerators. Beyond that it is likewise possible to simultaneously triturate the sulfur and/or the vulcanization accelerators with the 50-60% by weight resin dispersion, under use of a cooled grinding mill. The obtained mixture is then dispersed in water and diluted with further water to the concentration of 5-25% customary in practice.

The aqueous coating mass can contain the customary adjuvants and addtivies, such as surface active substances, anti-settling agents, antioxidants, pigments and dyestuffs. The usable coating composition is brought into contact with the anode and the electrically conductive substrate which is to be coated, which functions as cathode. For its deposition on the cathode, the employed voltage amounts as a rule to from 200 to 350 volts, with the initial current density amounting, through current limitation, to 0.1 to 1 A/100 cm$^3$. The mentioned conditions are thus generally similar to those used customarily for the deposition of other cationic resins.

After the introduction of the coating mass, the substrate, composed of steel, aluminum or a metal alloy, is in usual manner washed, dried and then heated for hardening to a temperature above 120° C., preferably from 140° to 180° C. The sulfur crosslinking according to the present invention allows thus in particular, the hardening of electrophoresis resin to be performed at lower temperatures than in the case of the previously customary isocyanate crosslinking. The indeed with a hardening temperature of 140° C. obtained lacquer displays beyond that an improved adhesive strength to the untreated metal. An improved adhesive strength of the hardened coating is obtained even without use of adhesion promotors based upon heavy metal compounds, in particular lead compounds, and in unpigmented form, with which form additions for the enhancement of the adhesive strength were previously incompatible.

The novel features which are considered characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

The meanings for the abbreviations in the experimental section are as follows:

A = Nisso BF-1000 = commercial product of Nippon Soda, epoxidized 1,2-polybutadiene, molecular weight 1100, epoxide content = 8%

$B_1$ = Epikote 1001, commercial product of Shell AG, bisglycidylether of bisphenol A or its polymers, epoxide value (equivalents of epoxide groups per 100 g): 0.2-0.225; molecular weight: 900-1000

$B_2$ = Epikote 828, commercial product of Shell AG, bisglycidylether of bisphenol A or its polymers, epoxide value: 0.51-0.56; molecular weight: 300-400

$B_3$ = Epikote 834, commercial product of Shell AG, bisglycidylether of bisphenol A or its polymers, epoxide value: 0.37-0.43; molecular weight: 460-540

$C_0$ = di-(ricineneamidoethylene)-amine = di(amidoethylene)amine of dehydrated castor oil acids $C_1$ = 80 Mole-% di-(ricineneamidoethylene)-amine + 20 mole-% methylisobutylketimine of ricineneamidoethylene-aminoethyleneamine $C_2$ = 40 Mole-% di-(ricineneamidoethylene)-amine + 60 mole-% methylisobutylketimine of ricineneamidoethylene-aminoethyleneamine $C_3$ = 40 mole-% di-(amidoethylene)-amine of linseed oil fatty acids + 60 mole-% methylisobutylketimine of amidoethylene (of linseed oil fatty acids)-aminoethyleneamine $D_1$ = β-(diethylamino)-propionic acid hydrazide $D_2$ = β-(di[ricineneamidoethylene]-amino)-propionic acid hydrazide $E_1$ = diethanolamine $E_2$ = diethylamine MDI = 4,4′-diisocyanato-diphenylmethane TDI = 2,4- or 2,6-diisocyanatotoluene (mixture)

MA-OH = Methallyl alcohol

HEMA = hydroxyethylmethacrylate

BCHM = bicyclo-[2.2.1]-heptyl-5 or 6-hydroxymethylene

HPMA = hydroxypropylmethacrylate

Mecellac = Methylglycolacetate

MBTS = dibenzothiazyldisulfide

TMTD = tetramethylthiuramdisulfide

DPTT = dipentamethylenthiuramtetrasulfide

DNPS = di-t-nonylpolysulfide

MBT = 2-mercaptobenzothiazole

DPG = diphenylguanidine

DETU = diethylthiourea

ZDEC = zinc-N-diethyldithiocarbamate

ZMBT = zinc salt of 2-mercaptobenzothiazole

S = sulfur

I. PRODUCTION OF STARTING MATERIALS SELECTED

1. Production of di-(ricineneamido-ethylene)-amine ($C_0$)

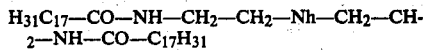

In 540 g (2 mole) ricinenic acid, dissolved in methanol, 103 g (1 mole) diethylenetriamine are added dropwise. Subsequently the solvent is distilled off and the reaction mixture is heated to about 180° C. bath temperature under distilling off of the split off water. One obtains the diamide practically quantitatively.

2. Production of a Mixture of 80 Mole-% $C_0$ and 20 Mole-% of Methylisobutylketimine of Ricineneamidoethylene-aminoethyleneamine $C_1$ = 80 Mole-% $C_0$ + 20 Mole-%

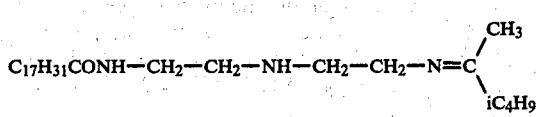

The charge is composed of the following components:

729 g (2.7 mole) ricinenic acid, dissolved in 600 ml methanol, 154 g (1.5 mole) diethylenetriamine, dissolved in 150 ml methanol, 150 g methylisobutylketone, and 375 ml toluene The ricinenic acid dissolved in methanol is placed in a flask, and under stirring reacted with the diethylenetriamine solution. The methanol is then removed from the produced amine salt under vacuum; the remainder is heated slowly under mild flow of $N_2$ to an oil bath temperature of 180° C., whereby under splitting off of the water, the amide is formed. The water is distilled off during the reaction. For blocking of the residual primary amino group, the reaction mixture is cooled down then to 100° C., treated with toluene and methylisobutylketone, and heated under utilization of a water separator under reflux, until water no longer runs over, which is the case after about 3 hours. Subsequently, the toluene is removed as well as the excess methylisobutylketone, under vaccum. The remaining residue has an amine number of about 100 and contains a small portion of imidazolidine derivative formed under splitting off of water. The yield amounts to 1750 g. The product possesses an average molecular weight of 573.

In analogous procedure, a mixture of these two types of compounds:

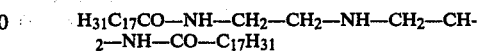

and

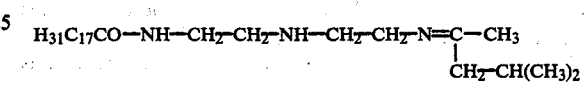

are produced in other mole ratios ($C_2$).

In analogous manner, the mixture of the reaction products of the mixed fatty acids of linseed oil with diethylenetriamine and methylisobutylketone is prepared in different mole ratios ($C_3$).

3. Production of Disubstituted β-aminopropionic acid hydrazides:

$D_1$ = β-(diethylamino)-propionic acid hydrazide $D_2$ = β-(di[ricineneamidoethylene]-amino)-propionic acid hydrazide (a) Stage 1: Disubstituted β-aminopropionic acid ester The secondary amine $E_2$ or $C_0$ is provided. With the easily boiling diethylamine $E_2$, one can employ an excess (e.g. 3-times), while with the non-distillable di-(ricineneamidoethylene)-amine $C_0$ one uses either the stoichiometric amount as about 30% solution in methanol or it is provided in pure form. The acrylic acid methyl- or ethyl-ester is added dropwise, after which the reaction mixture is allowed to react at 60°–90° C. for about 1 hour more. Excess amine or solvent is then distilled off in an evaporator, and the residue, which no longer contains acrylic double bonds, is used for further reactions.

(b) Stage 2: Disubstituted β-aminopropionic acid hydrazides

The 1–2-times stoichiometric amount of hydrazine hydrate is provided dissolved in twice the amount by weight of methanol. One then adds at room temperature the solution from I.3a) into the 2–3-times of methanol, followed by heating under reflux for 2–3 hours. Subsequently, methanol is removed in an evaporator and perhaps excess hydrazine hydrate. The amine content in the remaining residue corresponds nearly to the theoretical amount. The product is used directly for resin cooking.

4. Urethane Formation from Diisocyanates with Monoalcohols

In a round flask the diisocyanate, such as MDI or TDI, dissolved in water-free acetic acid-ethyl ester, is provided in a weight ratio of about 1:2, and under light $N_2$-flow the alcohol, such as MA-OH, HEMA, BCHM or HPMA, is allowed to drip in within about 20 minutes under water bath cooling. The mole ratio of diisocyanate-alcohol amounts to 1:1.4. The reaction mixture is subsequently heated for 30 minutes under stirring to about 50° C. The acetic ester is then removed in a vaccum at maximum bath temperature of 50° C. The yield is quantitative, with remaining NCO-content corresponding to the theoretical values.

II. RESIN PRODUCTION

1. Production of Water-Dispersible Cationic Polydiene Resins Through Reaction With Secondary Amines Combination (A)/(C) and (A)/(E) (Table 1, Resins 1-2)

The 1,2-polybutadienepolyepoxide A and the above under I.2. described amine component $C_2$ or $E_1$ are together heated to 160° C. under stirring and passing over of $N_2$ for 20 or 30 minutes. The reaction mixture is subsequently cooled down to about 100°–80° C., adding if necessary the solvent, after which further cooling is allowed to 70° C., followed by adding so much water, in which the acetic acid necessary for partial neutralization is dissolved, that a suspension with 20% solids is obtained. This suspension, in case ketimino groups are contained, is stirred yet at least 24 hours at room temperature.

2. Production of Water-Dispersible Cationic Polybutadiene Resins Under Inclusion Of Bisglycidyl Compounds Based Upon Bisphenol-A through Reaction With Secondary Amines (Combination (A)/(B)/(C) and (A)/(B)/(C)/(E); (Table I; Resin Nos. 3-10)

(a) Without urethane modification (Table 2, Nos. 1-27)

The manner of operation for the production of the 8 resins summarized (Table 2) is as follows:

The epoxide components 1,2-polybutadienepolyepoxide and the glycidylether of bisphenol A are provided and heated under $N_2$-atmosphere to 120°–130° C. The amide component $C_1$ or $C_2$ or the mixture of amide components $C_1$ or $C_2$ and the amine $E_1$ or $E_2$ are then added dropwise in 5 minutes under good stirring, allowing 5–10 minutes more for after-reactions at 130° C., following which the reaction mixture is cooled down and if necessary the solvent is added at about 70° C. under strong stirring, with subsequent addition of water and acetic acid in such manner that the amine is only partially neutralized (see Table 1) and a suspension with a desired solids content results. At least 24 hours more are subsequently allowed for after-reaction at room temperature.

(b) With urethane modification (Table 3)

The reaction of epoxide components A and B with the amine compounds C and E follows in the manner described under II-2a. After the ensuing addition of solvent, the reaction product is reacted at about 70° C. with the partly blocked diisocyanate (prepared according to I.4 with monohydroxyl-group-containing compounds), allowing 30–40 minutes after-reaction at 50°–70° C., and proceeding then further as specified under II. 2.a).

3. Production of Water-Dispersible Cationic Epoxide Resin Through Reaction With Secondary Amines (Combination (B)/(C); Table 1, 11-3 and Table 2, 28-30)

The bisglycidylether based upon bisphenol A is heated, together with the amine component $C_1$ or $C_3$ under nitrogen and stirring, for 15 minutes to 105° C. The reaction mixture is then cooled down to 100°–80° C., the solvent is then added thereto, and it is diluted subsequently at about 70° C. with so much water, in which the calculated amount of acetic acid is present, that a suspension with 20% content of solids is obtained.

4. Production Of Hydrazide Containing Cationic Resins (Combination (A)/(B)/(D) and (B)/(D), Table I: 14-17)

(a) Polybutadiene Containing Resin (Combination A/B/D, Table 4, Examples 1 and 2)

1,2-polybutadienepolyepoxide and the hydrazide $D_1$ are heated, under nitrogen and stirring, for 15 minutes to 200° C. The reaction mixture is then cooled down to about 100° C., bisglycidylether $B_1$ is added and if necessary hydrazide $D_2$ (Example 2, Resin 15), followed by after-reacting for 15 minutes at this temperature. After cooling down to about 70° C., the reaction mixture is diluted initially with the solvent and then with so much water, containing the amount of acetic acid necessary for partial neutralization, that a suspension with 20% content of solids results.

(b) Polybutadiene-free Resin (Combination (B)/(D), Table 4, Examples 3 and 4)

The bisglycidylether $B_1$ or $B_2$ and the hydrazide $D_2$ are heated together for 15 minutes under stirring in $N_2$-atmosphere to 100° C. Subsequently the reaction product is diluted with solvent and then with water and with the acetic acid necessary for partial neutralization. A suspension with 20% content of solids is preferred for electrophoretic deposition.

III. WORKING-IN OF THE CROSSLINKING COMPONENTS (WITHOUT PIGMENTATION)

In most cases the insoluble in water additives such as sulfur and/or accelerators are added to the 20% resin suspension and stirred for at least 2 hours. In case the grain size amounts to greater than $2\mu$, it is advisable to grind the product beforehand in e.g. a ball mill to a grain fineness of less than $2\mu$.

Better distribution of the solid particles in the suspension and in subsequently deposited application is obtained when the about 50–60% resin suspension (partially neutralized) is intimately blended with the solid additions in a cooled 3-roll mill, and subsequently diluted with water to about 20%.

IV. PRODUCTION OF THE CATIONIC ELECTROCOATING LACQUERS UNDER INCLUSION OF PIGMENT PASTES 1-4

1. Recipe for Pigment Pastes Nos. 1-3, Table 5

200 parts of 60% resin 6 from Table 1 are diluted with 50 parts of a solvent mixture of methylethylketone, methylisobutylketone, isopropanol (1:1:1) and 210 parts water. Thereto is added (a) for the pigment paste 1, 50 parts talc, 12.5 parts lead silicate, 2.5 parts carbon black 80 parts $TiO_2$ and 45 parts sulfur;

(b) for the pigment paste 2, the components from (a) +37.5 parts carbon black and (c) for the pigment paste 3, the components from (a) +40 parts red iron oxide.

These mixtures are then finely ground together in the cooled sand mill. The so obtained pigment pastes have a solids content of about 47–50%.

Subsequently 3400 parts of a 20% resin 6 solution from Table 1 are stirred into each of these mixtures, and different portions of deionized water, depending upon pigment paste concentration, are added, so that 20% suspensions are obtained. Before deposition, the mixtures are stirred for at least 24 hours.

2. Recipe For Pigment Paste No. 4, Table 5

1000 parts 60% resin 6 are diluted with 200 parts butylglycol to 50% solids content. 400 parts are then withdrawn, for addition thereto of 30 parts carbon black, 30 parts talc, 30 parts sulfur and 3 parts dibenzothiazylidsulfide (MBTS), after which the mixture is ground intensively in a cooled 3-roll mill. This product is then mixed with the remaining 800 parts of 50% resin solution, and diluted with about 2170 g deionized water to a 20% suspension. Before deposition, this suspension is stirred for at least 24 hours.

V. COATING OF THE TEST PLATES

The coating of the metal plates in a bath with the cationic resin or electrocoating lacquer produced from Examples of Tables 1–5, is carried out at room temperature under good intimate mixing of the bath suspensions under the conditions given in the Tables, for 30 seconds. After subsequent rinsing with deionized water and 30 minutes of stoving at various temperatures, the films display in the preponderance of cases a smooth surface, high hardness and aimed at values of layer thickness. The films are also free of pinholes on untreated iron plates. The corrosion resistance of the EC-lacquers is tested with Bonder 120 (commercial phosphatized steel plates, Metallgesell-Schaft, Frankfurt/M.). After 250 hours salt spray test, no attack on the cross-cut is determined. Also the unpigmented resin depositions display a substantially better corrosion stability not only upon non-degreased iron plates but also upon phosphatized plates, than typical resins, which are not crosslinked with sulfur.

The pencil hardness values given in the Examples are determined according to the generally customary methods. This is described in "Laboratory Book For Lacquer And Coating Agent Industry" of Zeidler-Bleisch (Wilhelm Knapp Publishers, Düsseldorf, Third Edition, 1967) on page 298. The salt spray test carried out in the examples is pursuant to according to German Industrial Standard SK-DIN-50 017.

TABLE 1

Compositions and Reaction Conditions For The Resins Produced From Different Components

| Resin Number | Polydiene Resin Nisso BF1000 A | Epikote 1001 $B_1$ | Epikote 828 $B_2$ | Epikote 834 $B_3$ | Di(amidoethylene)amines $C_1$ | $C_2$ | $C_3$ | $\beta$-amino propionic acid hydrazide $D_1$ | $D_2$ | Diethanolamine $E_1$ | Diethylamine $E_2$ |
|---|---|---|---|---|---|---|---|---|---|---|---|
| 1 | 1 | | | | | 2,5 | | | | | |
| 2 | 1 | | | | | | | | | 2 | |
| 3 | 1 | 2 | | | | 3 | | | | | |
| 4 | 1 | | 2 | | 2 | | | | | | |
| 5 | 1 | | | 2 | | 3 | | | | | |
| 6 | 1 | 2 | | | | 2 | | | | 1 | |
| 7 | 1 | 2 | | | | 2 | | | | 1 | |
| 8 | 1 | 2 | | | 3 | | | | | | 2 |
| 9 | 1 | 1,5 | | | | 2 | | | | 1 | |
| 10 | 1 | | 2 | | | 2 | | | | 1 | |
| 11 | | 1 | | | | 1,75 | | | | | |
| 12 | | 1 | | | | 1,5 | | | | | |
| 13 | | 1 | | | | | | 1,5 | | | |
| 14 | 1 | 1 | | | | | | 3 | | | |
| 15 | 1 | 2 | | | | | | 2 | 3 | | |
| 16 | | 1 | | | | | | | 2 | | |
| 17 | | | 1 | | | | | | 1,5 | | |

| Resin Number | Solvent Type | Amount [g/100 g solids] | Reaction Temperature [°C.] | Reaction Time [min.] | Degree of neutralization relative to tert. amine [%] |
|---|---|---|---|---|---|
| 1 | — | — | 160 | 120 | 30 |
| 2 | Mecellac | 10 | 160 | 30 | 50 |
| 3 | — | — | 130 | 30 | 50 |
| 4 | — | — | 130 | 15 | 50 |
| 5 | — | — | 130 | 30 | 50 |
| 6 | Mecellac | 10 | 130 | 15 | 50 |
| 7 | " | 10 | 130 | 30 | 30 |
| 8 | " | 10 | 130 | 15 | 50 |
| 9 | — | — | 130 | 15 | 50 |
| 10 | — | — | 130 | 30 | 50 |
| 11 | Mecellac | 20 | 105 | 15 | 50 |
| 12 | " | 20 | 105 | 15 | 50 |
| 13 | " | 20 | 105 | 15 | 50 |
| 14 | " | 20 | 200/100 | 15/15 | 50 |

TABLE 1-continued

Compositions and Reaction Conditions For
The Resins Produced From Different Components

| 15 | " | 10 | 200/100 | 15/15 | 20 |
| 16 | " | 10 | 100 | 15 | 50 |
| 17 | " | 10 | 100 | 15 | 50 |

TABLE 2

Electrophoretic Deposition of Amine-modified Resins with Vulcanization Accelerators and/or Sulfur

| Run Number | Resin Number | Additive Type | Additive % relative to solid | Rupture Voltage [V] | Deposition Voltage [V] | Stoving Temperature [°C] (30 min.) | Appearance | | Thickness [μm] | Pendulum Hardness according to König |
|---|---|---|---|---|---|---|---|---|---|---|
| 1 | 6 | MBTS | 5 | 375 | 300 | 180 | smooth | dull | 17 | 155 |
| 2 | " | TMTD | 5 | 380 | 300 | 180 | " | " | 16 | 145 |
| 3 | " | DPTT | 10 | 385 | 300 | 180 | " | " | 13 | 135 |
| 4 | " | DNPS | 10 | 310 | 275 | 180 | " | glossy | 24 | 105 |
| 5 | " | S | 5 | 390 | 300 | 180 | " | " | 17 | 125 |
| 6 | " | " | 10 | 390 | 300 | 180 | " | " | 15 | 142 |
| 7 | " | " | 10 | | | 160 | " | " | 15 | 125 |
| 8 | " | " | 10 | | | 140 | " | " | 14 | 117 |
| 9 | " | " | 20 | 385 | 300 | 180 | " | dull | 15 | 172 |
| 10 | " | " | 50 | 385 | 300 | 180 | " | " | 14 | 128 |
| 11 | " | " | 75 | 385 | 300 | 180 | " | glossy | 12 | 111 |
| 12 | " | S + MBT | 20 + 2 | 405 | 300 | 180 | " | " | 15 | 190 |
| | " | | | | | 160 | " | " | 13 | 189 |
| | " | | | | | 140 | " | " | 13 | 160 |
| | " | | | | | 120 | " | " | 15 | 98 |
| 13 | " | S + MBTS | 10 + 1 | 405 | 300 | 180 | " | " | 17 | 180 |
| 14 | " | S + DPG | 10 + 1 | 390 | 300 | 180 | " | " | 17 | 196 |
| 15 | " | S + DPTT | 10 + 1 | 395 | 300 | 180 | " | " | 12 | 163 |
| 16 | " | S + DETU | 10 + 1 | 395 | 300 | 180 | " | " | 16 | 200 |
| 17 | " | S + ZDEC | 10 + 1 | 330 | 300 | 180 | " | " | 19 | 159 |
| 18 | " | MBT + ZMBT + DPG + S | 0,75 + 0,75 + 0,8 + 2,25 | 405 | 300 | 180 | " | " | 15 | 146 |
| 19 | " | S + Isopropyldixynthogen | 10 + 1 | 375 | 300 | 180 | " | " | 17 | 115 |
| 20 | 7 | S | 5 | 420 | 375 | 140 | " | " | 18 | 105 |
| 21 | 3 | S | 5 | 400 | 375 | 160 | " | " | 19 | 121 |
| 22 | 5 | S | 5 | 285 | 225 | 180 | " | " | 25 | 119 |
| 23 | 4 | S | 5 | 200 | 150 | 180 | " | " | 25 | 114 |
| 24 | 9 | S | 5 | 280 | 250 | 160 | " | " | 20 | 109 |
| 25 | 10 | S | 5 | 190 | 175 | 180 | " | " | 22 | 124 |
| 26 | 2 | S + MBTS | 5 + 0,5 | 130 | 75 | 160 | " | " | 12 | 144 |
| 27 | 1 | S + MBTS | 5 + 0,5 | 175 | 125 | 140 | fine rippled | glossy | 27 | 107 |
| 28 | 11 | S + MBTS | 10 + 1 | 400 | 200 | 180 | non-smooth | " | 35 | 199 |
| 29 | 12 | S + MBTS | 5 + 0,5 | 500 | 200 | 180 | smooth | " | 20 | 108 |
| 30 | 13 | S + MBTS | 5 + 0,5 | 400 | 200 | 180 | non-smooth | " | 32 | 155 |

TABLE 3

Electrophoretic Deposition of Diurethane-modified Resins With Sulfur and if necessary Vulcanization Accelerators

| Run Number | Resin Number | Modification | Mole Ratio Resin:Diisocyanate | Additives Type | Additives % relative to solids |
|---|---|---|---|---|---|
| 1 | 8 | TDI—MA—OH | 1:4 | S + MBTS | 10 + 1 |
| 2 | 8 | MDI—HEMA | 1:4 | S + MBTS | 10 + 1 |
| 3 | 8 | TDI—BCHM | 1:4 | S + MBTS | 10 + 1 |
| 4 | 8 | TDI + HPMA | 1:4 | S + MBTS | 10 + 1 |

| Run Number | Deposition Voltage [V] | Stoving Temperature [°C] (30 min) | Stored Film Appearance | Thickness [μm] | Pendulum hardness acc. to König |
|---|---|---|---|---|---|
| 1 | 300 | 140 | lightly rippled, glossy | 25 | 121 |
| 2 | 300 | 140 | lightly rippled, glossy | 29 | 119 |

TABLE 3-continued

Electrophoretic Deposition of Diurethane-modified Resins With Sulfur and if necessary Vulcanization Accelerators

| | | | | | |
|---|---|---|---|---|---|
| 3 | 300 | 140 | smooth, glossy | 22 | 126 |
| 4 | 300 | 140 | " | 17 | 116 |

TABLE 4

Electrophoretic Deposition of Hydrazide-modified Epoxide Resins

| | | Additive | | | | | Stoved Film | | |
|---|---|---|---|---|---|---|---|---|---|
| Run No. | Resin No. | Type | % relative to solid | Rupture Voltage [V] | Deposition Voltage [V] | Stoving Temp. [°C.] (30 min.) | Appearance | Thickness ($\mu$m) | Pencil Hardness |
| 1 | 14 | S + MBT | 20 + 2 | 260 | 200 | 180 | smooth, glossy | 20 | >9H |
| 2 | 15 | S + MBT | 20 + 2 | 220 | 180 | 180 | smooth, glossy | 25 | >9H |
| 3 | 16 | S + MBTS | 10 + 1 | 320 | 250 | 180 | smooth, glossy | 32 | >9H |
| 4 | 17 | S + MBTS | 10 + 1 | 250 | 200 | 180 | fine-blistered, glossy | 35 | >9H |

TABLE 5

Electrophoretic Deposition of Pigmented Resin under Addition of Sulfur and if necessary Vulcanization Accelerators

| Run No. | Resin No. | No. of the pigmented paste | Ratio Resin:Pigment | $x_1$ additive Type | % relative to solid | Rupture Voltage [V] |
|---|---|---|---|---|---|---|
| 1 | 6 | 1 | 1:0,24 | S | 5 | 310 |
| 2 | 6 | 2 | 1:0,29 | S | 5 | 305 |
| 3 | 6 | 3 | 1:0,28 | S | 5 | 330 |
| 4 | 6 | 4 | 1:0,155 | S + MBTS | 5 + 0,5 | 420 |

| | | | Stoved Film | | |
|---|---|---|---|---|---|
| Run No. | Deposition Voltage [V] | Stoving Temp. [°C.] (30 min.) | Appearance | Thickness [$\mu$m] | Pendulum hardness acc. to Konig | Salt Spray Test [h] |
| 1 | 280 | 180 | smooth, glossy | 15 | 175 | >250 |
| | | 160 | " | 14 | 157 | " |
| | | 140 | " | 13 | 140 | " |
| 2 | 300 | 180 | " | 15 | 165 | " |
| | | 160 | " | 15 | 145 | >250 |
| | | 140 | " | 15 | 138 | " |
| 3 | 280 | 180 | " | 13 | 156 | " |
| | | 160 | " | 13 | 152 | >250 |
| | | 140 | " | 13 | 138 | " |
| 4 | 375 | 180 | " | 19 | 182 | " |
| | | 160 | " | 18 | 158 | >250 |
| | | 140 | " | 18 | 142 | " |

$x_1$ S-addition included in pigment paste
Salt spray test: no migration on the cross cut It will be understood that each of the elements described above, or two or more together, may also find a useful application in other types of coatings different from the types described above.

While the invention has been illustrated and described as embodied in a method for the crosslinking of cathodically depositable coating agents, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Method for the crosslinking of cathodically depositable coating agents, optionally containing pigment, dyestuff, filler, solvent, varnish adjuvant or additional crosslinking components, based upon a water-soluble or dispersible nitrogen based cationic resin, at least partially present as salt, comprising contacting a cationic resin having a molecular weight of at least 1000, containing 2 to 20 equivalents of double bonds per 1000 g with at least one member selected from the group consisting of sulfur, sulfur donor compounds and mixtures thereof as vulcanization accelerators, thereby obtaining a coating mixture, electrophoretically depositing said coating mixture onto an object, and hardening at temperatures above 120° C.

2. Method according to claim 1, wherein said cationic resin with a molecular weight of at least 1000 contains tertiary C-atoms.

3. Method according to claim 1, wherein said at least one member selected from the group consisting of sulfur, sulfur donor compounds and mixtures thereof is in combination with one or more sulfur-free vulcanization accelerators.

4. Method according to claim 1, wherein said cationic resin possesses 6 to 15 equivalents of double bonds per 1000 g, and contans no ester groupings.

5. Method according to claim 1, wherein said cationic resin is a reaction product of at least one member selected from the group consisting of
   (A) one epoxidized polydiene and
   (B) bisglycidylether of a polyphenol and at least one member selected from the group consisting of
   (C) one amide compound, which is formed from one or more higher, essentially unsaturated fatty acid(s) and a polyamine, and
   (D) one hydrazide compound, which contains tertiary amino groups,
and has been made with an acid with formation of cationic groups dispersible in water.

6. Method according to claim 5, wherein said resin is further a reaction product of
   (E) an organic secondary amine.

7. Method according to claim 6, wherein the organic secondary amine (E) is selected from the group consisting of diethylamine, methylethanolamine and diethanolamine.

8. Method according to claim 5, wherein said resin is a reaction product of at least one epoxidized polydiene (A), and contains excess epoxide groups.

9. Method according to claim 5, wherein component (A) is selected from the group consisting of epoxypolybutadiene-1,2, epoxypolybutadiene-1,4 and epoxy compound of a polybutadiene with 1,4- and 1,2-linkages.

10. Method according to claim 5, wherein component (B) is a bisglicydylether based upon bisphenol-A.

11. Method according to claim 5, wherein component (C) represents an amide compound which is the reaction product of a member selected from the group consisting of dehydrated castor oil fatty acids and linseed oil fatty acids with diethylenetriamine.

12. Method according to claim 11, wherein component (D) represents a carboxylic acid hydrazide with a tertiary amino group, provided through reaction of a member selected from the group consisting of acrylates, methacrylates and α-halogenocarboxylic acid esters with a member selected from the group consisting of dialkylamines of chain length $C_1$–$C_{18}$, dialkenylamines of chain length $C_2$–$C_{18}$ and said amide compounds, and subsequent hydrazinolysis.

13. Method according to claim 11, wherein said amide compound contains a ketimino group.

14. Method according to claim 5, further comprising modifying the resins with double bond containing derivatives selected from the group consisting of urethane derivatives and urea derivatives.

15. Method according to claim 5, wherein said amide compound contains a ketimino group or hydroxyl group.

16. Objects including substrate with hardened coatings obtained according to the method of claim 1.

* * * * *